(12) United States Patent
Bhaskara et al.

(10) Patent No.: US 10,506,161 B2
(45) Date of Patent: Dec. 10, 2019

(54) IMAGE SIGNAL PROCESSOR DATA TRAFFIC MANAGEMENT

(71) Applicant: QUALCOMM Incorporated, San Diego, CA (US)

(72) Inventors: Aravind Bhaskara, San Diego, CA (US); Wenbiao Wang, San Diego, CA (US); Tao Shen, San Diego, CA (US); Mohit Bhave, San Diego, CA (US); Nishant Hariharan, San Diego, CA (US); Jun Liu, Irvine, CA (US); Jeffrey Hao Chu, San Diego, CA (US); Scott Cheng, Foothill Ranch, CA (US)

(73) Assignee: Qualcomm Incorporated, San Diego, CA (US)

( * ) Notice: Subject to any disclaimer, the term of this patent is extended or adjusted under 35 U.S.C. 154(b) by 43 days.

(21) Appl. No.: 15/794,673

(22) Filed: Oct. 26, 2017

(65) Prior Publication Data
US 2019/0132513 A1    May 2, 2019

(51) Int. Cl.
| | | |
|---|---|---|
| *H04N 5/232* | (2006.01) | |
| *H04N 5/907* | (2006.01) | |
| *H04N 5/77* | (2006.01) | |
| *H04N 5/91* | (2006.01) | |

(52) U.S. Cl.
CPC ......... *H04N 5/23241* (2013.01); *H04N 5/772* (2013.01); *H04N 5/907* (2013.01); *H04N 5/91* (2013.01); *H04N 5/23293* (2013.01)

(58) Field of Classification Search
CPC ............... H04N 5/23241; H04N 5/907; H04N 5/23293; H04N 5/91; H04N 5/772
See application file for complete search history.

(56) References Cited

U.S. PATENT DOCUMENTS

| | | | |
|---|---|---|---|
| 6,809,422 B2* | 10/2004 | Saito | G06T 1/0007 257/777 |
| 7,088,371 B2 | 8/2006 | Lippincott | |
| 7,545,416 B2* | 6/2009 | Shimazu | H04N 5/232 348/222.1 |
| 8,027,534 B2 | 9/2011 | Ono | |
| 8,531,570 B2* | 9/2013 | Sugimura | H04N 5/772 348/322 |
| 8,687,086 B1* | 4/2014 | Campbell | H04N 19/423 348/222.1 |
| 9,443,281 B2 | 9/2016 | Redzic et al. | |
| 9,699,374 B2* | 7/2017 | Song | H04N 5/23222 |
| 9,967,466 B2* | 5/2018 | Lin | H04N 5/232 |

(Continued)

*Primary Examiner* — Shahbaz Nazrul
(74) *Attorney, Agent, or Firm* — Terry Tsai

(57) ABSTRACT

Methods and apparatus to manage image signal processor (ISP) data traffic is provided. The apparatus includes an ISP having an ISP front-end configured to receive image data and a first memory configured to store the image data. The ISP front-end is further configured to output the image data stored in the first memory to a second memory via a memory link in response to the image data stored in the first memory reaching a size threshold. Another apparatus includes apparatus includes a camera sensor configured to output image data in a camera mode, an ISP on a die, a camera link coupling the camera sensor and the ISP, a memory, and a memory link coupling the ISP and the memory. The memory link is configured to enter a low-power mode in the camera mode.

10 Claims, 8 Drawing Sheets

(56) References Cited

U.S. PATENT DOCUMENTS

| | | | |
|---|---|---|---|
| 2002/0118894 A1* | 8/2002 | Morimoto | G06T 1/0007 |
| | | | 382/305 |
| 2004/0085462 A1* | 5/2004 | Sasaki | G06T 1/20 |
| | | | 348/231.6 |
| 2009/0256932 A1* | 10/2009 | Morimoto | G03B 19/12 |
| | | | 348/231.99 |
| 2013/0002901 A1* | 1/2013 | Athreya | H04N 5/23241 |
| | | | 348/223.1 |
| 2013/0016114 A1* | 1/2013 | Rabii | G09G 5/363 |
| | | | 345/589 |
| 2015/0098114 A1* | 4/2015 | Morino | H04N 1/32454 |
| | | | 358/1.16 |
| 2015/0109486 A1 | 4/2015 | Ramalingaiah et al. | |
| 2015/0189121 A1* | 7/2015 | Shinya | H04N 1/32448 |
| | | | 358/1.13 |
| 2016/0277658 A1 | 9/2016 | Kim et al. | |

* cited by examiner

IMAGE SIGNAL PROCESSOR DATA TRAFFIC MANAGEMENT

FIELD

Certain aspects of the present disclosure generally relate to apparatuses that manage image signal processor (ISP) data traffic.

BACKGROUND

Modern electronic devices (such as cell phones) are complex machines incorporating various components. For a cell phone, such components may include wireless communication components. The cell phone may further include a camera sensor (e.g., a CMOS imager) and an ISP operating on the image data from the camera sensor. The ISP may perform pixel postprocessing, such as de-mosaicing the image data. The pixel postprocessing may further include adjusting the image data for camera functions such as focus, exposure, balance, and coloring scheme. The cell phone may further include a video encoder to encode the data from the ISP to video bitstreams and a display processor to receive the video bitstreams and to output the video bitstreams in a format for display. The cell phone may also include the display panel to display the video bitstreams.

Power is consumed to transfer the image data through the various stages. A well-managed ISP data traffic may reduce power consumed by the electronic devices.

SUMMARY

This summary identifies features of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

A slow, uniformly spread-out ISP data traffic pattern may lead to higher power consumption. The present disclosure is directed to, inter alia, methods and apparatus to manage the ISP data traffic (e.g., image data traffic) and to reduce the power consumption arising from the ISP data traffic.

An apparatus for managing ISP data traffic is provided. The apparatus includes an image signal processor (ISP) having an ISP front-end configured to receive image data and a first memory configured to store the image data. The ISP front-end is further configured to output the image data stored in the first memory to a second memory via a memory link in response to the image data stored in the first memory reaching a size threshold.

A method for managing ISP data traffic is provided. The method includes receiving image data by an ISP front-end of an ISP; storing the image data in a first memory; and outputting, by the ISP front-end, the image data stored in the first memory to a second memory via a memory link in response to the image data stored in the first memory reaching a size threshold.

Another apparatus for managing ISP data traffic is provided. The apparatus includes a camera sensor configured to output image data in a camera mode, an ISP on a die, a camera link coupling the camera sensor and the ISP, a memory, and a memory link coupling the ISP and the memory. The memory link is configured to enter a low-power mode in the camera mode.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

As used herein, the term "coupled to" in the various tenses of the verb "couple" may mean that element A is directly connected to element B or that other elements may be connected between elements A and B (i.e., that element A is indirectly connected with element B). In the case of electrical components, the term "coupled to" may also be used herein to mean that a wire, trace, or other electrically conductive material is used to electrically connect elements A and B (and any components electrically connected therebetween).

The present disclosure discloses apparatuses that manage ISP data traffic (e.g., image data traffic). Such apparatuses may include a cell phone, a mobile computing device, a laptop computer, a desktop computer (PC), a computer peripheral device, a multimedia device, a video device, an audio device, a global positioning system (GPS), a wireless sensor, and/or an Internet of Things device. In a camera mode (e.g., when a camera app is activated), the apparatus may manage the ISP data traffic by periodically putting a memory link into a low-power mode.

Figure 1:
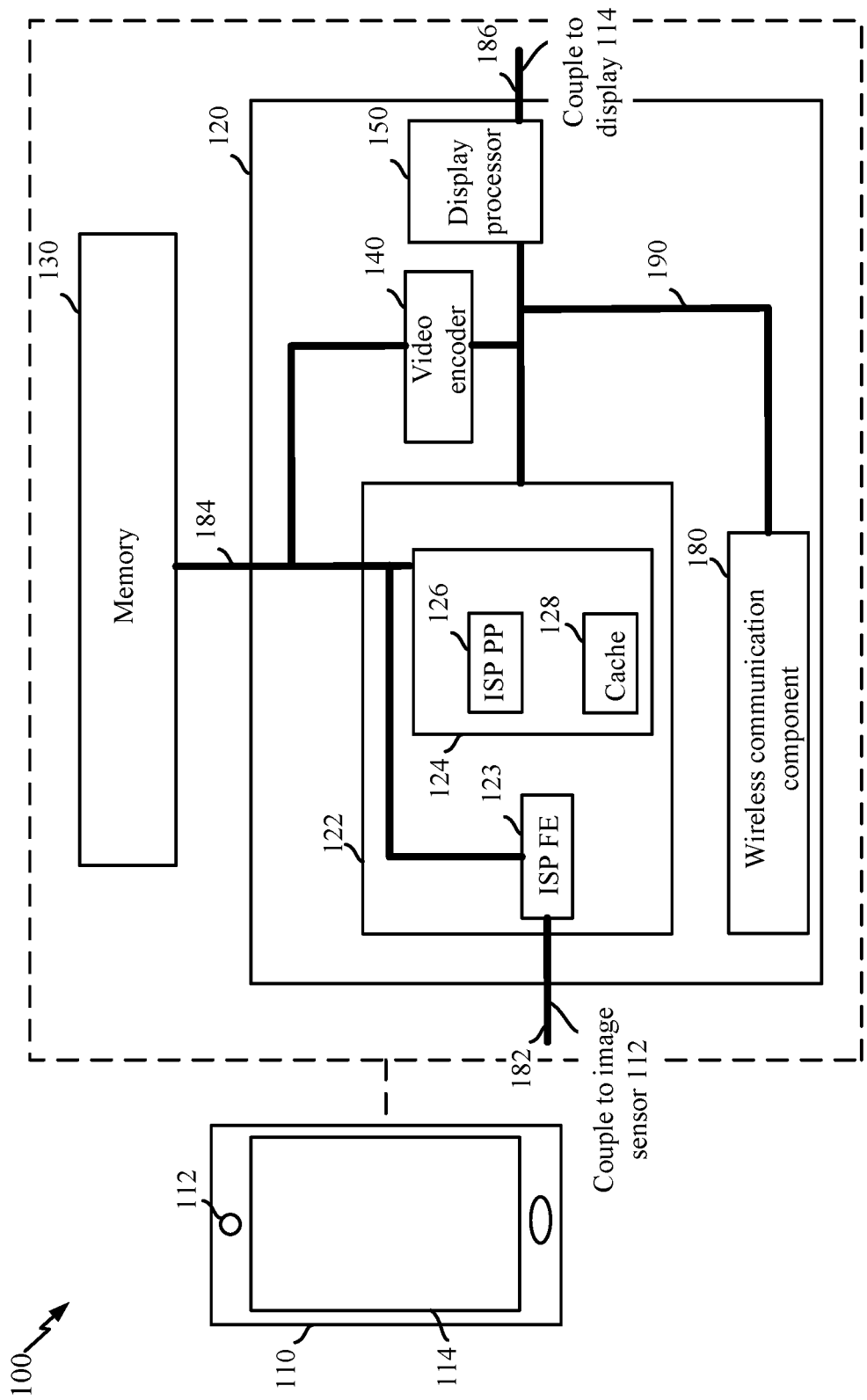
FIG. 1 is a diagram of an apparatus configured to manage ISP data traffic.

FIG. 1 is a diagram 100 of an apparatus 110 configured to manage ISP data traffic. The apparatus 110 (e.g., a cell phone) includes a camera sensor 112 to capture images for photos and videos and a display to display the images and videos, when enabled in a camera mode. The apparatus 110 further includes an application processor 120 and a memory 130. A camera link 182 couples the camera sensor 112 and the application processor 120. A memory link 184 couples the application processor 120 and the memory 130. A display link 186 couples the application processor 120 and the display 114.

The application processor 120 includes various components, such as a wireless communication component 180 to operate the wireless communication functions. The application processor 120 further includes an image signal processor (ISP) 122, a video encoder 140, and a display processor 150 for the camera mode operations. The components of the application processor 120 (e.g., the ISP 122, the video encoder 140, the display processor 150, and the wireless communication component 180) are coupled via a bus system 190. The ISP 122 includes an ISP front-end 123 and an ISP back-end 124. The ISP back-end 124 includes an ISP pixel postprocessing core (ISP PP) 126 and a cache 128. The ISP front-end 123, the ISP back-end 124, the video encoder 140, and a display processor 150 are coupled to the memory 130 via the memory link 184.

Figure 2:
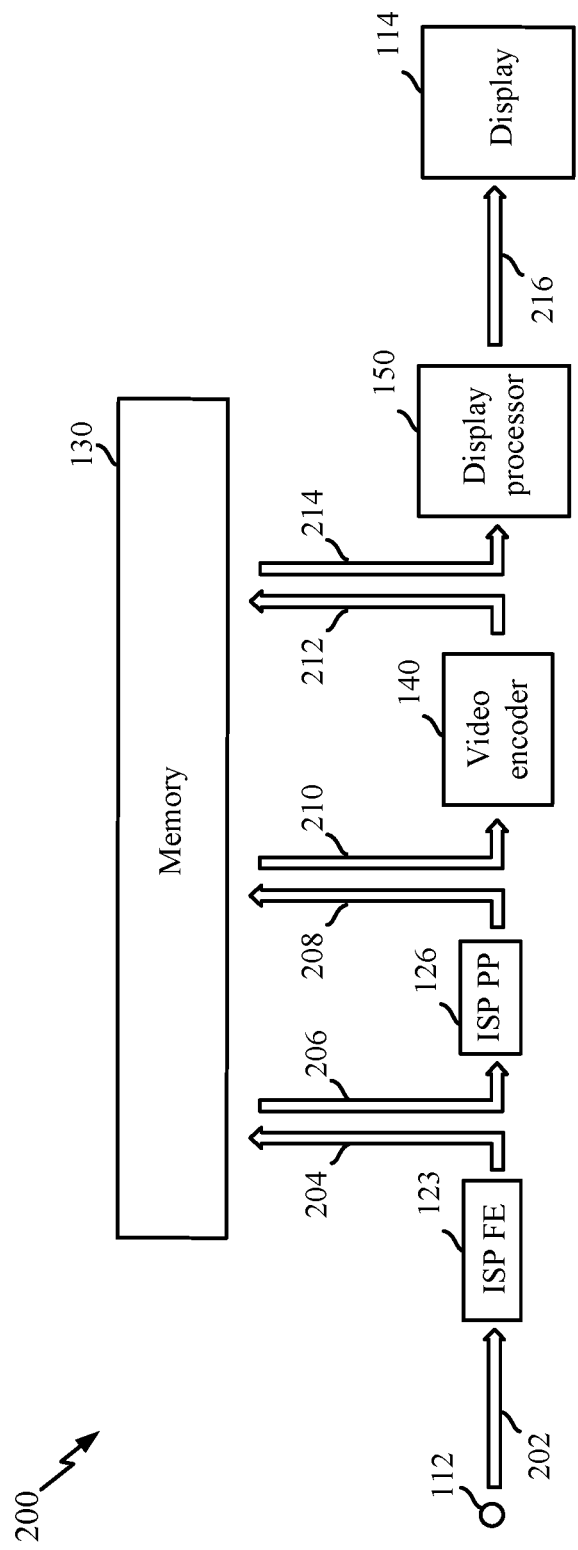
FIG. 2 is a diagram of the ISP data traffic.

FIG. 2 is a diagram 200 of ISP data traffic. The apparatus 110 (see FIG. 1) may enter a camera mode for taking pictures or videos. In the camera mode, the camera sensor 112 (see FIG. 1) may activate to capture images. Referring to FIG. 2, The camera sensor 112 may output the image data of the captured images at 202 to the ISP front-end 123 of the ISP 122 via the camera link 182 (see, FIG. 1). The camera link 182 may be, for example, a die-to-die, Camera Serial Interface (CSI) link. In some examples, the camera sensor 112 may output the image data in real time.

The ISP front-end 123 may output the image data at data traffic 204 to the memory 130 via the memory link 184 (see FIG. 1). The memory 130 may be a double-data rate (DDR) dynamic random access memory (DRAM) system. The memory link 184 may be a die-to-die connection or interface conforming to a DDR interface specification, such as the Low Power DDR (LPDDR) specification. In such fashion, the memory 130 may function as an external (e.g., not on a same die) buffer to store the image data from the camera sensor 112. In some examples, the ISP front-end 123 may differentiate from the ISP back-end 124 by the ISP front-end 123 receiving the image data via the camera link 182 and/or outputting the image data to the memory 130 via the memory link 184.

The ISP PP 126 of the ISP back-end 124 may receive the image data at data traffic 206 from the memory 130 via the memory link 184. The ISP PP 126 may perform pixel postprocessing functions on the image data, such as de-mosaicing the image data and adjusting the image data for focus, exposure, balance, and coloring scheme. The ISP PP 126 may cache data for these functions in the cache 128 (see FIG. 1). The ISP PP 126 may output the processed image data (ISP data) at data traffic 208 to the memory 130 via the memory link 184. In such fashion, the memory 130 may function as an external (e.g., not on a same die) buffer to store ISP data from the ISP back-end 124.

The video encoder 140 may receive ISP data at data traffic 210 from the memory 130 via memory link 184. The video encoder 140 may compress the ISP data into bitstreams and output the bitstreams (video data) at 212 to the memory 130 via the memory link 184. In such fashion, the memory 130 may function as an external (e.g., not on a same die) buffer to store the video data from the video encoder 140. The display processor 150 may receive the video data at data traffic 214 from the memory 130 via the display link 186 (see FIG. 1). The display processor 150 may convert the video data into a format suitable for display by the display 114. The display processor 150 may output the converted video data (display data) at data traffic 216 to the display 114 for display. In some examples, the image data of the captured images, the ISP data, the video data and/or the display data may be considered as image data in broader terms.

Figure 3:
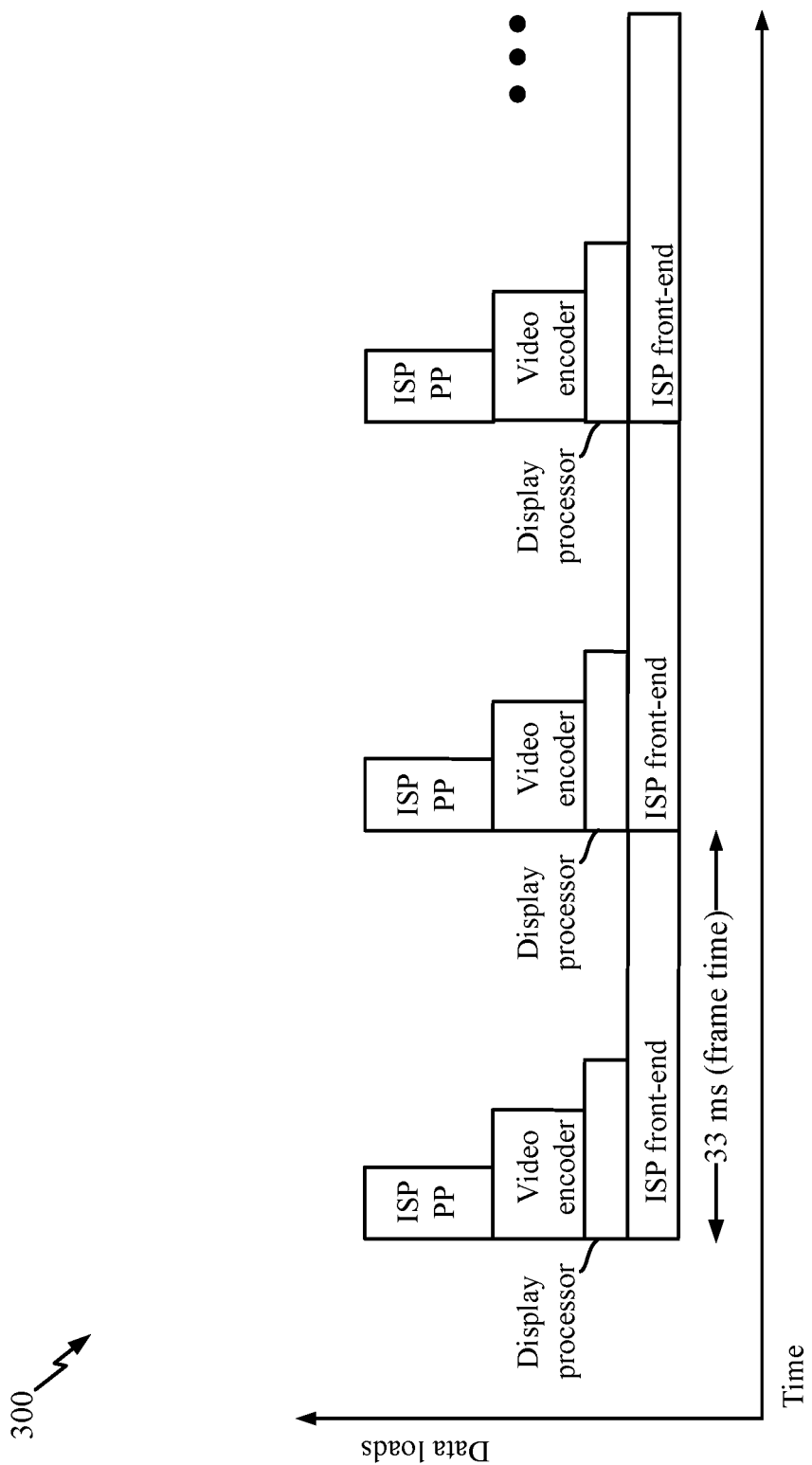
FIG. 3 is a diagram of data loads on the memory link.

FIG. 3 is a diagram 300 of data loads on the memory link 184 (see FIG. 1). The diagram 300 depicts time in the X-axis and data loads in the Y-axis. The data load (e.g., corresponding to the data traffic 204; see FIG. 2) from the ISP front-end 123 (see FIG. 1) may spread over the 33 ms of a frame of an image. The throughput of the camera link 182 (see FIG. 1) may be lower than the throughput of the memory link 184 (see FIG. 1). For example, the camera link 182 may be slower than the memory link 184 and therefore, the ISP front-end 123 may be providing the image data to the memory 130 via the memory link 184 persistently or constantly over the 33 ms frame time. The data loads from or to the ISP PP 126 (e.g., corresponding to the data traffic 206 and 206; see FIG. 2), from or to the video encoder 140 (e.g., corresponding to the data traffic 210 and 212; see FIG. 2), and to the display processor 150 (e.g., corresponding to the data traffic 214; see FIG. 2) may be higher in volume, but may be transmitted on the memory link 184 over only a portion of the 33 ms frame time.

Figure 4:
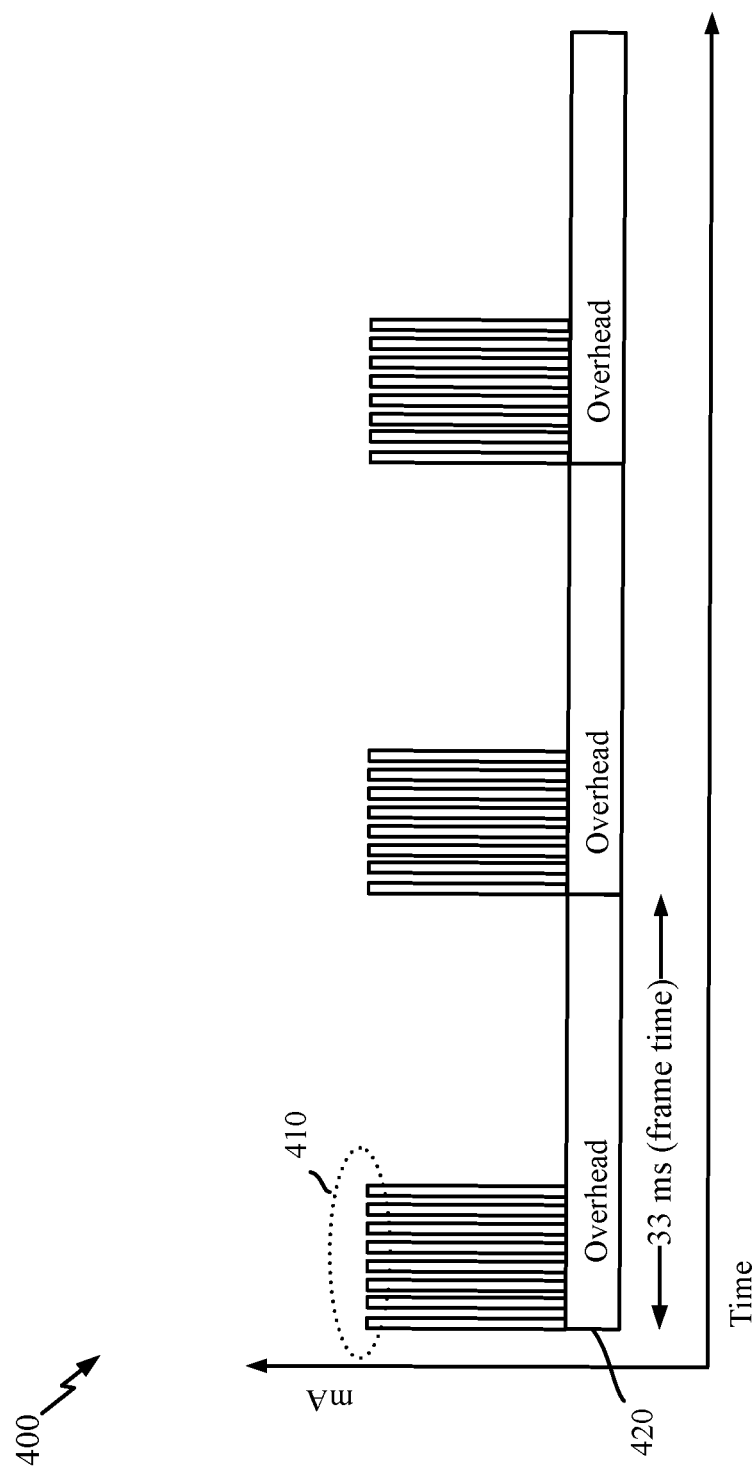
FIG. 4 is a diagram of power usage on the memory link.

FIG. 4 is a diagram 400 of power usage on the memory link 184. The diagram 400 depicts time in the X-axis and power usage (mA) in the Y-axis. Over the 33 ms of a frame, the power consumed on the memory link 184 (see FIG. 1) includes the access portion 410 and the overhead portion 420. The access portion 410 may correspond to the data reads and data writes over the memory link 184 (see FIG. 1) and may correspond to the data loads (from and/or to the ISP PP 126, the video encoder 140, the display processor 150, and the ISP front-end 123; see FIG. 1) described with FIG. 3. The overhead portion may correspond to the power consumed to keep the memory link 184 in the ready state for data reads and data writes. For example, such power consumed may include power used to keep the data lines of the memory link 184 at a certain voltage for the data reads and data writes and increased voltages on the drivers and receivers of the memory link 184. Because the data load (e.g., corresponding to the data traffic 204) from the ISP front-end 123 is present through the 33 ms of a frame, the memory link 184 cannot go into a power-down state to conserve power. The overhead portion 420 may consume a significant amount of power for the apparatus 110 in the camera mode.

Figure 5:
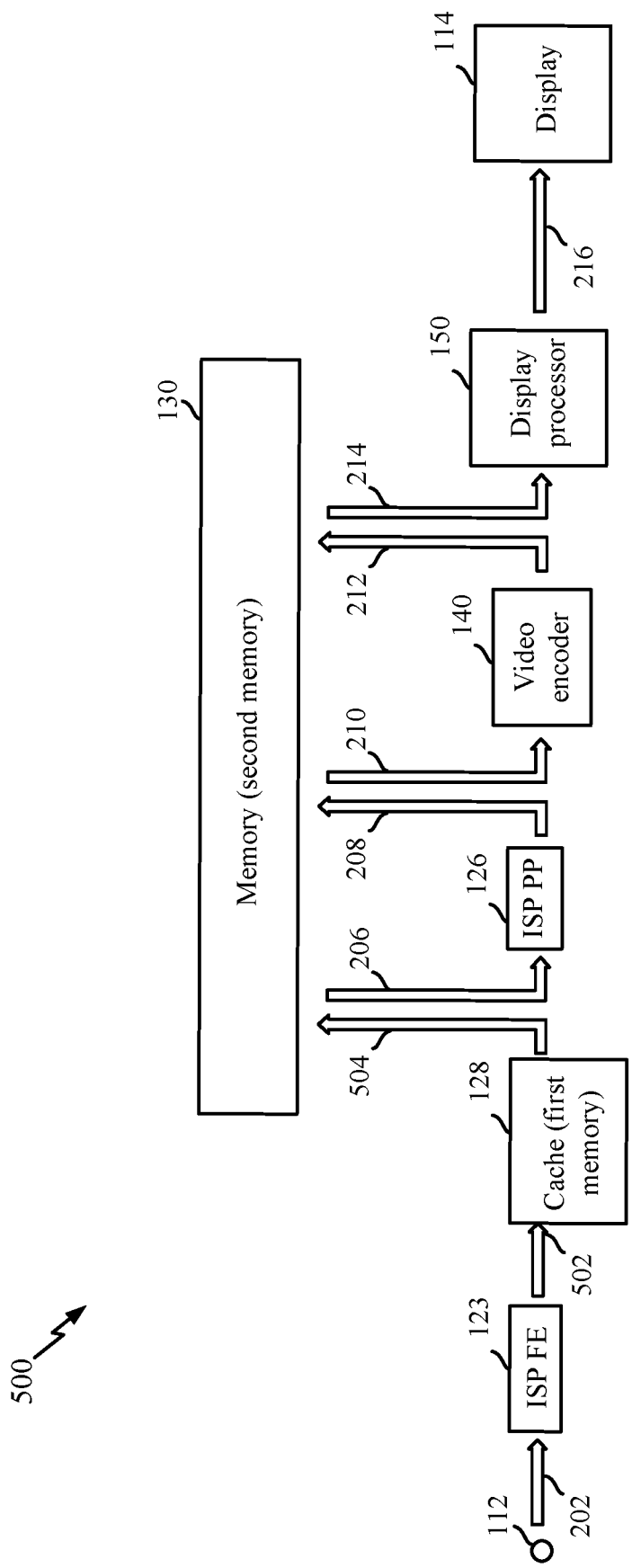
FIG. 5 is a diagram of ISP data traffic utilizing a first memory and a second memory.

FIG. 5 is a diagram 500 of ISP data traffic utilizing a first memory and a second memory. In some examples, the application processor 120 (see FIG. 1) and/or the ISP 122 (see FIG. 1) may include an additional, on-die buffer configured to store the image data to reduce the overhead portion 420. In some examples, the additional, on-die buffer may be referred to as a first memory and the memory 130 may be referred to as a second memory for clarity. In some examples, the additional, on-die buffer (the first memory) may include the cache 128 used by the ISP PP 126 for caching data used for pixel postprocessing. The physical cache 128 may have a portion of the memory capacity (e.g., 100 KB) reserved to store the image data, for example. The cache 128 may thus be shared as a cache for the ISP back-end 124 and as a buffer for the image data.

The diagram 500 depicts the ISP data traffic with the first memory provided. The ISP front-end 123 provides at data traffic 502 the image data to the cache 128 (the first memory). The ISP front-end 123 may be further configured to output the stored image data at 504 from the first memory (e.g., cache 128) to the second memory (e.g., memory 130) via the memory link 184 (see FIG. 1), in response to the stored image data reaching a size threshold (e.g., 100 KB). By storing the image data first in the on-die first memory, the ISP front-end 123 may not need to access the second memory (e.g., memory 130) via the die-to-die memory link 184 for the entire 33 ms frame time. The memory link 184 may thus be idle for a portion of the 33 ms, and the apparatus 110 may accordingly enter the memory link 184 into a low-power mode to conserve power (e.g., conserving the overhead portion 420) during the idle period. In such fashion, the memory link 184 may be configured to enter a low-power mode in the camera mode for only a portion of the 33 ms frame time.

Figure 6:
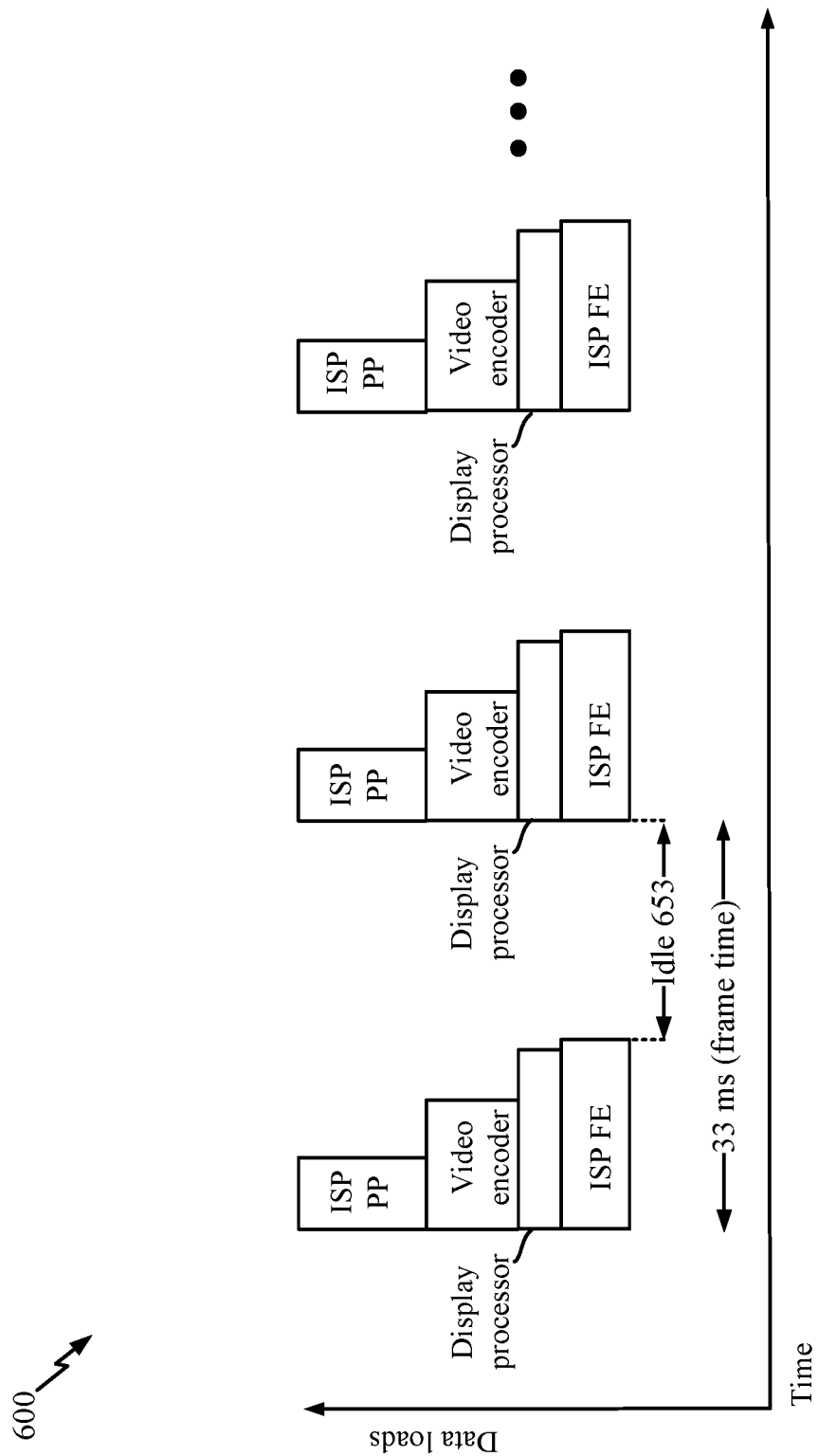
FIG. 6 is a diagram of data loads on the memory link utilizing the first memory and the second memory.

FIG. 6 is a diagram 600 of data loads on the memory link 184 (see FIG. 1) utilizing the first memory and the second memory. The diagram 600 depicts that the data load from the ISP front-end 123 (see FIG. 1) is not provided persistently or spread uniformly to the second memory (e.g., the memory 130) over the 33 ms frame time, as the image data is stored in the first memory (e.g., the cache 128; see FIG. 1) until the stored image data reaches a size threshold. Accordingly, the memory link 184 is idle (e.g., no data reads or data writes) in the idle period 653.

Figure 7:
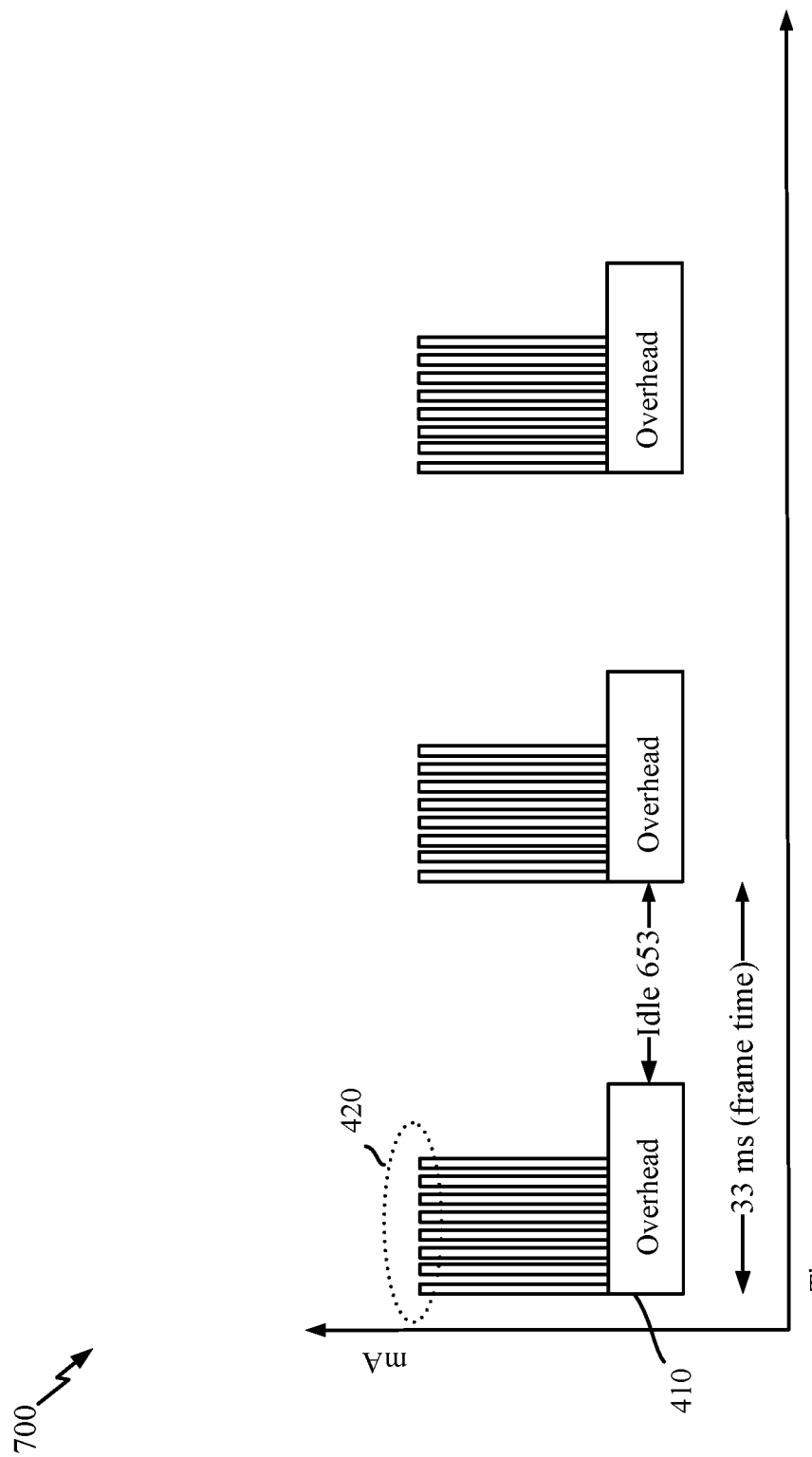
FIG. 7 is a diagram of power usage on the memory link utilizing the first memory and the second memory.

FIG. 7 is a diagram 700 of power usage on the memory link 184 (see FIG. 1) utilizing the first memory and the second memory. The diagram 700 depicts that the overhead portion 420 is not present in the idle period 653. As the memory link 184 enters the low-power mode, the overhead portion 420 to keep the memory link 184 ready for data reads and data writes may not be needed. The power consumption may thus be reduced in the idle period 653 of the memory link 184.

As presented with FIGS. 1-6, aspects of the present disclosure provide an apparatus to manage ISP data traffic. The apparatus 110 may include one of a cell phone, a mobile computing device, a laptop computer, a desktop computer (PC), a computer peripheral device, a multimedia device, a video device, an audio device, a global positioning system (GPS), a wireless sensor, and an Internet of Things device incorporating the ISP 122 (e.g., the ISP front-end 123 and the ISP back-end 124; see FIG. 1), the first memory (e.g., the cache 128; see FIG. 1), the second memory (e.g., the memory 130; see FIG. 1), the memory link 184 (see FIG. 1), the camera sensor 112 (see FIG. 1), and/or the camera link 182 (see FIG. 1). The ISP 122 may include the ISP front-end 123 configured to receive image data (e.g., from the camera sensor 112 via the camera link 182). The first memory (e.g., the cache 128) may be configured to store the image data. The ISP front-end 123 may be configured to output the image data stored in the first memory to the second memory (e.g., the memory 130) via the memory link 184 in response to the image data stored in the first memory reaching a size threshold.

The ISP 122 may further include the ISP back-end 124 configured to receive the image data (e.g., once stored in the first memory) from the second memory via the memory link 184. The cache 128 may be associated with the ISP back-end 124. The camera sensor may be configured to output the image data of captured images to the ISP front-end 123 via the camera link 182. The throughput of the camera link 182 may be lower than the throughput of the memory link 184. The camera link 182 may couple the camera sensor 112 and the ISP 122 (e.g., the ISP front-end 123). The memory link may couple the ISP 122 and the memory 130.

Further aspects of the disclosure provide the apparatus 110 incorporating the camera sensor 112 (see FIG. 1) configured to output the image data in a camera mode, the ISP 122 on a die, the camera link 182, the memory 130, and/or the memory link 184. The memory link 184 may be configured to enter a low-power mode in the camera mode. The apparatus 110 may further include a buffer (e.g., cache 128) on the die configured to store the image data until a size threshold is reached.

Figure 8:
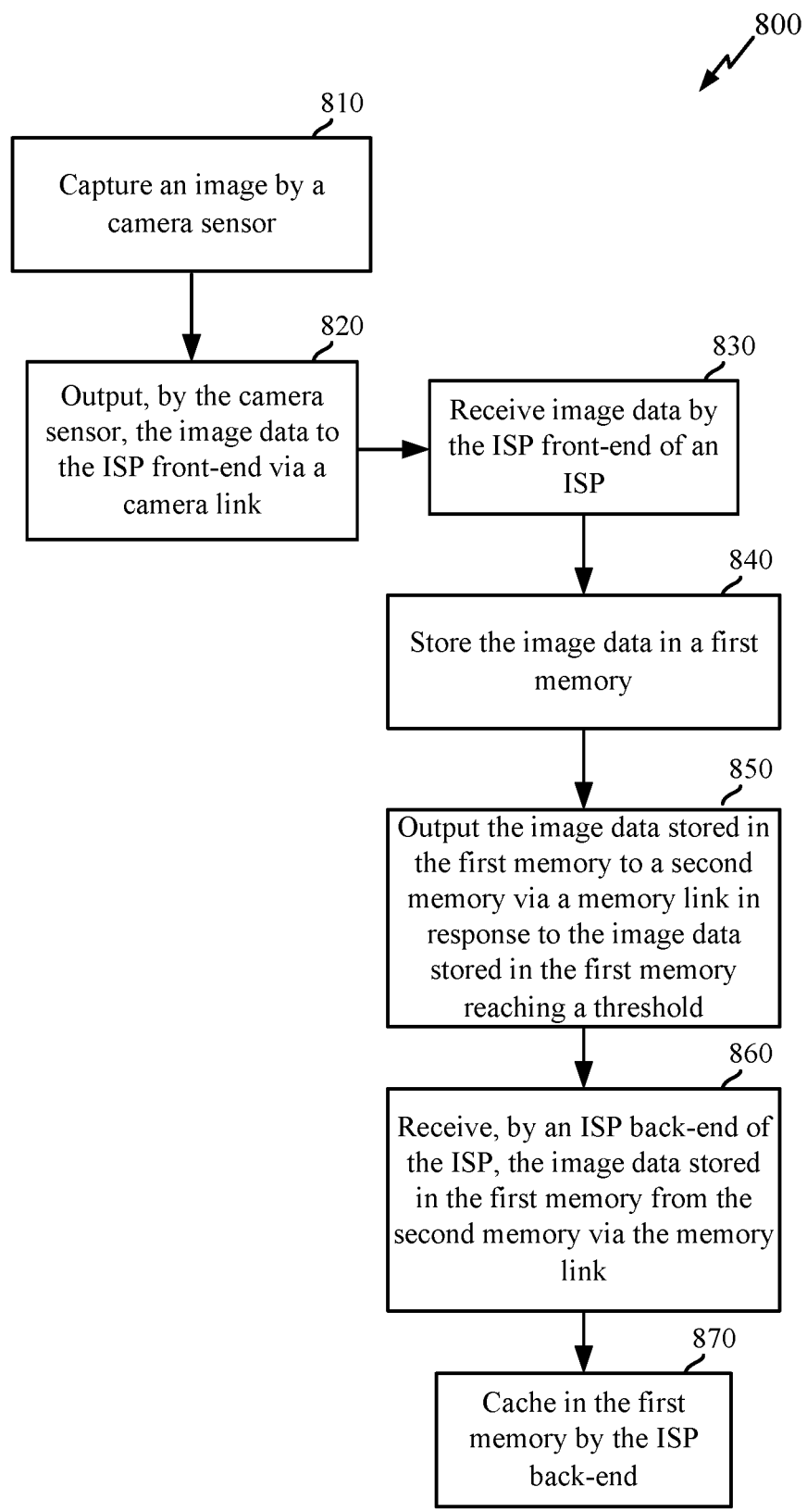
FIG. 8 is a flow diagram of a method of the apparatus to manage the ISP data traffic.

FIG. 8 is a flow diagram 800 of a method of the apparatus 110 (see FIG. 1) to manage the ISP data traffic. The method may be performed by the various components presented in FIGS. 1-7. At 810, an image is captured by a camera sensor 112 (see FIG. 1). For example, the apparatus 110 may activate the camera sensor 112 in a camera mode to capture images for photos and/or videos. At 820, the image data is outputted by the camera sensor 112 to the ISP front-end 123 via a camera link 182. At 830, the image data is received by the ISP front-end 123 of the ISP 122 (see FIG. 1). At 840, the image data is stored in a first memory. For example, the first memory may include the cache 128 (associated with the ISP back-end 124; see FIG. 1) on a same die as the ISP 122 (see FIG. 1).

At 850, the image data stored in the first memory is outputted to a second memory (e.g., the memory 130; see FIG. 1) via a memory link 184 (see FIG. 1) in response to the image data stored in the first memory reaching a size threshold. For example, the cache 128 may be associated with the ISP back-end 124 for caching data for the pixel postprocessing. A size threshold of 100 KB may be reserved in the cache 128 to store the image data from the camera sensor 112. The ISP front-end 123 (see FIG. 1) may provide the image data stored in the cache 128 to the memory 130 via the memory link 184, in response to the image data stored in the cache 128 reaching the size threshold of 100 KB.

At 860, the image data stored in the first memory is received by the ISP back-end 124 from the second memory (e.g., the memory 130) via the memory link 184. The ISP back-end 124 may perform pixel postprocessing on the stored image data. At 870, the ISP back-end 124 may cache data in the first memory (e.g., the cache 128) to perform the pixel postprocessing.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

The blocks, modules, components, circuits, and functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. For example, the steps may be implemented by circuits to perform the functions described herein and/or circuits generating the signals for the functions described herein, or combinations thereof. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus, comprising:
    an image signal processor (ISP) having an ISP front-end configured to receive image data;
    a camera sensor;
    a camera link, wherein the camera sensor is configured to output the image data to the ISP front-end via the camera link;
    a first memory configured to store the image data, wherein the ISP is further configured to output the image data stored in the first memory to a second memory via a memory link in response to the stored image data reaching a size threshold,
    wherein the ISP further comprises an ISP back-end configured to receive the image data from the second memory via the memory link, and wherein the first memory comprises a cache memory associated with the ISP back-end.

2. The apparatus of claim 1, further comprising the second memory and the memory link.

3. The apparatus of claim 2, wherein a throughput of the camera link is lower than a throughput of the memory link.

4. The apparatus of claim 2, further comprising:
    one of a cell phone, a mobile computing device, a laptop computer, a desktop computer (PC), a computer peripheral device, a multimedia device, a video device, an audio device, a global positioning system (GPS), a wireless sensor, and an Internet of Things device incorporating the ISP front-end, the ISP back-end, the first memory, the second memory, the memory link, the camera sensor, and the camera link.

5. The apparatus of claim 2, wherein the memory link is configured to enter a low-power mode in response to the first memory storing the image data.

6. The apparatus of claim 5, wherein the memory link enters the low-power mode in a camera mode.

7. A method for managing ISP data traffic, comprising:
    receiving image data by an ISP front-end of an ISP;
    capturing an image by a camera sensor;
    outputting, by the camera sensor, the image data to the ISP front-end via a camera link;
    storing the image data in a first memory;
    outputting, by the ISP, the image data stored in the first memory to a second memory via a memory link in response to the image data stored in the first memory reaching a size threshold;
    receiving, by an ISP back-end of the ISP, the image data from the second memory via the memory link; and
    caching in the first memory by the ISP back-end.

8. The method of claim 7, wherein a throughput of the camera link is lower than a throughput of the memory link.

9. The method of claim 7, further comprising entering a low-power mode, by the memory link, in response to the first memory storing the image data.

10. The method of claim 9, wherein the memory link enters the low-power mode in a camera mode.

* * * * *